United States Patent

Iwata

[11] 4,299,520
[45] Nov. 10, 1981

[54] DRIVE NUT

[75] Inventor: Yukichi Iwata, Tokyo, Japan

[73] Assignee: Iwata Bolt Kogyo Kabushiki Kaisha, Tokyo, Japan

[21] Appl. No.: 109,588

[22] Filed: Jan. 4, 1980

[51] Int. Cl.³ .................. F16B 37/00; F16B 39/286
[52] U.S. Cl. ................................. 411/437; 411/259
[58] Field of Search ............ 85/32 V, 33; 151/21 R, 151/21 C, 14 R; 411/437, 306, 259, 333, 335

[56] References Cited

U.S. PATENT DOCUMENTS 2,294,059  8/1942  Thompson .............. 85/32 V X
2,393,520  1/1946  Crowther ................. 151/21 R Primary Examiner—Ramon S. Britts
Attorney, Agent, or Firm—Beveridge, DeGrandi, Kline & Lunsford

[57] ABSTRACT

A drive nut has a hollow interior in which a plurality of cantilever clamping members which are arranged with equal spacing around a common circle and extend substantially parallel to the nut centerline, and which are rigidly and integrally fixed at their lower ends to the nut inner side near the bottom seating surface thereof. The clamping members thus form a substantially cylindrical passage through which a mating member with a male screw thread is forcibly driven axially from the side of the seating surface relative to the nut to be quickly but positively locked by the drive nut.

5 Claims, 5 Drawing Figures

U.S. Patent   Nov. 10, 1981   4,299,520
FIG. 1
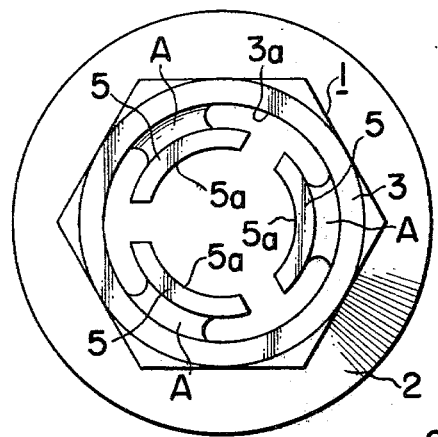
FIG. 2
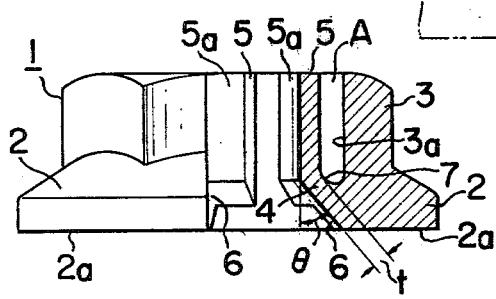
FIG. 3
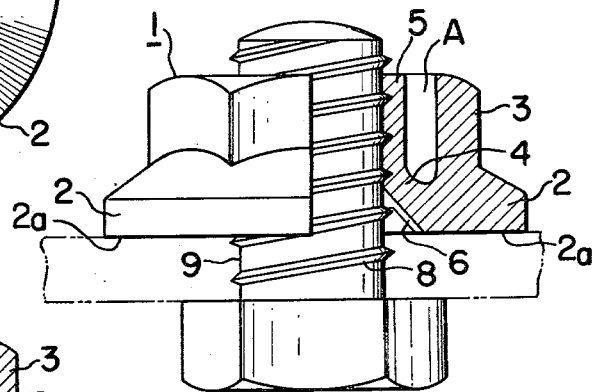
FIG. 4
FIG. 5
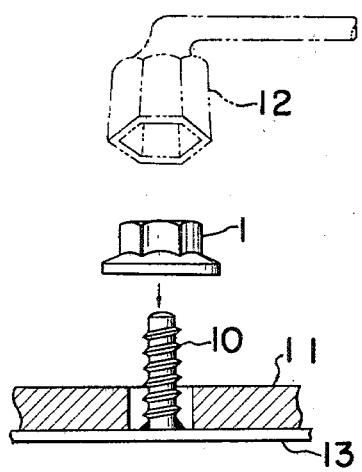

— 4,299,520 —

DRIVE NUT

BACKGROUND OF THE INVENTION

This invention relates generally to screw fastenings and more particularly to a drive nut into which a mating member such as a screw can be relatively driven by striking or otherwise driving against a relatively low resistance into a locked state which cannot be readily unlocked except by turning either member in unscrewing action.

Heretofore, a conventional nut as specified by a standard specification has a cylindrical hole provided on its inner wall surface with a female screw thread to mesh with the male screw thread of a mating member such as a bolt or a screw. By causing relative screw turning movement between the nut and the mating member with their screw threads in meshed state, the nut is caused to move in its axial direction relative to the mating member thereby to effect tightening or loosening.

In the case where the length of the male screw thread of the mating member is long, the nut must be turned a great number of times relative to the mating member, and this disadvantageously requires much time before the tightened state between the two members is attained.

SUMMARY OF THE INVENTION

It is an object of this invention to provide a drive nut for screw fastening which can be quickly driven axially relative to a mating member and thus tighened irrespective of the length of the male screw thread of the mating member.

Another object of the invention is to provide a drive nut which can be tightened as described above by axial driving against a relatively low resistance, and which can be further tightened by turning the nut relative to the mating member in the conventional screw tightening direction.

Still another object of the invention is to provide a drive nut which is securely and positively locked to the mating member when tightened as described above by axial driving and/or turning.

A further object of the invention is to provide a drive nut which, after being tightened in the above described manner relative to the mating member can be readily unfastened by unscrewing in the conventional manner.

According to this invention, briefly summarized, there is provided a drive nut for screw fastening in cooperation with a mating member having a male screw thread, said drive nut having an axial centerline and comprising, in integrally constructed combination: a crown coaxial with the centerline; a bottom flange disposed coaxially with and contiguously below the crown, the crown and flange having a coaxial hole formed therethrough and defined by an inner wall surface; and a plurality of clamping members disposed with constant spacing around a common circle about the centerline and constituting, in combination, an intermittent, substantially cylindrical structure spaced apart radially inward from said inner wall surface with an annular gap therebetween and having a hollow interior through which the mating member is to be forcibly thrust in axial direction for said screw fastening, each clamping member being rigidly connected at the root part thereof to said inner wall surface and thereby constituting a form of cantilever lever to be elastically deflected radially outward from the centerline by the mating member upon being thus forcibly thrust.

The nature, utility, and further features of this invention will be more clearly apparent from the following detailed description with respect to a preferred embodiment of the invention when read in conjunction with the accompanying drawing briefly described below.

BRIEF DESCRIPTION OF THE DRAWINGS

In the drawings:

FIG. 1 is a top plan view of the example of the drive nut according to this invention;

FIG. 2 is a side view orthogonal to FIG. 1 with the right half of the nut in section taken along a plane in which the centerline of the nut lies;

FIG. 3 is a side view similar to FIG. 2, showing the nut in meshed and tightened state relative to a mating member;

FIG. 4 is a side view indicating one example of use of the drive nut of this invention in conjunction with a stud bolt; and FIG. 5 is a side view indicating another example of use of the drive nut, wherein it functions as a cap nut.

DETAILED DESCRIPTION OF THE INVENTION

The drive nut 1 according to this invention in the instant example is formed from a synthetic resin and has an external shape resembling that of a flange nut, that is, comprising a hexagonal head or crown 3 and a bottom flange 2 integrally and coaxially formed with the crown 3. For the sake of convenience in description, FIG. 1 will be considered to be a top plan view, and FIG. 2 an elevation, whereby the crown 3 is on top of the bottom flange 2. The flange 2 has an annular seating surface 2a at its bottom. The combination of the crown 3 and the flange 2 has a hollow cylindrical interior defined by a cylindrical inner wall surface 3a.

Coaxially disposed within the hollow cylindrical interior of the nut is an intermittent cylindrical wall formed by a plurality of identical clamping members 5 spaced apart with equal angular spacing and having fragmentary cylindrical shapes, three of these clamping members 5 being used in the illustrated example. These clamping members 5 are separated radially inwardly toward the centerline of the nut from the inner wall surface 3a with a gap A therebetween. These clamping members 5 have concave cylindrical inner surfaces 5a lying in a common geometrical cylinder coaxial with the nut 1 and serving as parts of a female screw when engaged by a mating member as described hereinafter.

The upper edges of the clamping members 5 are flush with the upper surface of the crown 3. Each clamping member 5 is integrally joined at its lower part by a connective root part 4 to the inner part of the bottom flange 2 as shown in the drawing. The inner surface of this root part 4 is a concavely tapered or beveled surface 6 diverging downward from the nut centerline with an angle θ therebetween. The thickness t of the root part 4 between this tapered surface 6 and the opposite inner surface 7 of the groove formed by the gap A is so selected that the root part 4 will have suitable resilience for causing the clamping member 5 to clamp with ample force the mating member 9, such as a screw or bolt, with male screw thread 8.

The drive nut of this invention of the above described construction is used and functions in the following manner. The drive nut 1 is fitted from its part of the tapered surface 6 onto a mating member 9 having the male screw thread 8 and is struck or otherwise forcibly driven in the axial driving direction relative to the mating member 9. As a consequence, the clamping members 5 are forced radially outward from the nut centerline as they deflect elastically outward in the manner of cantilever beams, and the mating member 9 is received into the drive nut 1 forcibly but with relatively low axial resistance. The elastic reaction force of the clamping members 5 causes them to tightly clamp the mating member 9, whereby the male screw thread 8 tends to bite into the inner surfaces 5a of the clamping members 5, which therefore function as a female screw thread. The drive nut 1 and the mating member 9 are thus securely locked to each other.

Upon completion of the above described axial driving of the drive nut, the fastening state of the nut and the mating member can be made even more positive by turning either member in the screwing-in direction with a suitable tool such as a wrench engaged with the crown 3 of the nut, whereby an axial force is produced by the screw action between the above mentioned female screw thread constituted by the clamping members 5 and the male screw thread 8, and a tight fastening state is obtained.

When it is necessary to unfasten the drive nut which has been thus tightened, it is turned in the unscrewing direction with a suitable tool applied to its crown 3 thereby to disengage the nut 1 from the mating member 9.

In one example of use of the drive nut of this invention as shown in FIG. 4, a member 11 is to be fastened against a base member 13. For this purpose a stud bolt 10 is permanently secured at its one end to the base member 13 at a position to extend through a hole formed in the member 11. The drive nut 1 is placed on the other end of the stud bolt 10 so that the tapered surface 6 fits onto that end of the stud bolt. The drive nut 1 is then driven home along the shank of the stud bolt 10 by means of a hammer or a socket wrench 12 struck with a hammer, the seating surface 2a of the drive nut thereby being placed in firm contact with the outer surface of the member 11. The members 11 and 13 are thereby held firmly against each other. This fastening state can be made even more secure by turning the drive nut 1 in the tightening direction through a relatively small angle by means of a wrench or the like.

In another example of use of the drive nut 1 as illustrated in FIG. 5, the drive nut is used as a cap nut or as a tapped, integral part of a base member 13. For this purpose, the drive nut 1 is fixedly held by a support member 14 against the base member 13 on the side thereof opposite the side against which a member 11 is to be fastened, the seating surface 2a of the drive nut 1 being placed in contact with that side of the base member 13. Holes of suitable diameter are drilled beforehand respectively in the members 11 and 13 in coaxial register with the drive nut 1. In this case, a mating member with male screw thread, such as a screw 10a, is driven by striking into the drive nut 1 from the side of the member 11 through the previously drilled holes until the seating surface of the head of the screw 10a contacts and is pressed against the outer surface of the member 11. For further tightening, the screw 10a is turned in the tightening direction through a relatively small angle.

Important and advantageous features of the drive nut according to this invention are afforded by its construction and operation, particularly the provision of the clamping members 5 and their action. As mentioned hereinbefore, when the mating member 9 with male screw thread is driven into the space formed between the inner surfaces 5a of the clamping members 5 as a result of either the nut 1 or the mating member 9 being struck or otherwise driven axially relative to the other member, the clamping members 5 are forced radially outward from the nut centerline as they deflect elastically as cantilever beams. The mating member 9 is thus received into the drive nut 1 forcibly but with relatively low axial resistance because of wedge action of this mating and because this forcible entry of the mating member 9 is in the direction of extension of the clamping members 5 functioning as cantilever beams.

As a result of their elastic reaction force, the clamping members 5 act in unison to tightly clamp the mating member 9, whereby the male screw thread 8 tends to bite into the inner surfaces 5a of the clamping members. While the mating member 9 is driven relatively into the nut 1 against a relatively low axial resistance, an axial force in the opposite direction, that is, in the direction for axially extracting the member 9 from the nut 1, causes forces to be exerted by a form of toggle action in a radially inward direction on the clamping members 5, which are thereby urged to contract and clamp the member 9 even more firmly. Thus, when either of the mating members 1 or 9 is turned relative to the other in the screw tightening direction, such an axial force is imparted to the mating member 9, which is thereby clamped even more tightly by the clamping members 5.

Another advantageous feature of the drive nut of this invention is that the desirable tight screw fastening state as described above can be attained in a very short time because of the axial driving operation carried out by hammering or other driving action and followed, when necessary, by a short screw-turning action. Still another advantageous feature of the drive nut of this invention is that, after it has been tightened very firmly in the above described manner, it can be readily loosened and unscrewed in the conventional manner when necessary.

While the invention has been described above with respect to a specific embodiment thereof, it will be apparent that many modifications can be made in the details of practice of the invention. For example, the drive nut of this invention can be formed from a material other than a synthetic resin such as, for example, a metal. Furthermore, the cross section of the crown 3 of the drive nut is not limited to a hexagon. In addition, the number of clamping members may be any plural number and not necessarily limited to three.

What I claim is:

1. A drive nut for screw fastening in cooperation with a mating member having a male screw thread, said drive nut having an axial centerline and comprising, an integrally constructed combination: a crown coaxial with the centerline; a bottom portion disposed coaxially with an contiguously below the crown, the crown and the bottom portion having a coaxial hole formed therethrough and defined by an inner wall surface; and a plurality of clamping members disposed with constant spacing around a common circle about the centerline and together forming an intermittent, substantially cylindrical structure spaced radially inward from said inner wall surfce with an annular gap therebetween and having a hollow interior through which the mating member is forcibly thrust in axial direction for said screw fastening, said hollow interior being defined by unthreaded internal faces of the clamping members, said unthreaded internal faces comprising the radially inwardmost components of said drive nut so that a mating member driven through the drive nut will engage only the unthreaded internal faces of the clamping members, each clamping member being rigidly connected at the root part thereof to said inner wall surface and constituting a form of a cantilever which is capable of being elastically deflected radially outwardly from the centerline by the mating member, said drive nut being formed of a material which enables the unthreaded internal faces of the clamping members to be bitten into by the screw threads of a mating member forcibly thrust into said hollow interior.

2. A drive nut according to claim 1 in which the crown is formed to have an outer peripheral shape of a polygon as viewed in cross section perpendicular to the centerline.

3. A drive nut according to claim 1 in which the bottom flange has a bottom seating surface remote from the crown and perpendicular to the centerline for contacting an article to be thus screw fastened, and the radially inner portion of the root part of each clamping member is beveled into a tapered surface diverging toward the seating surface from the centerline.

4. A drive nut according to claim 1 in which said bottom portion has a flange.

5. A drive nut according to any one of claims 1, 2, 3 or 4 wherein said drive nut is formed from a synthetic resin.

* * * * *

UNITED STATES PATENT AND TRADEMARK OFFICE
CERTIFICATE OF CORRECTION

PATENT NO. : 4,299,520
DATED : November 10, 1981
INVENTOR(S) : YUKICHI IWATA

It is certified that error appears in the above—identified patent and that said Letters Patent is hereby corrected as shown below:

ON THE COVER PAGE, THE FOLLOWING SHOULD BE ADDED:

[30] Foreign Application Priority Data

January 17, 1979 [JP] Japan....3059/1979

Signed and Sealed this

Nineteenth Day of January 1982

[SEAL]

Attest:

Attesting Officer

GERALD J. MOSSINGHOFF

Commissioner of Patents and Trademarks